(No Model.)

V. D. ANDERSON.
STEAM TRAP.

No. 525,524. Patented Sept. 4, 1894.

Witnesses

Inventor
Valerius D. Anderson,
by Dodge & Son
Attorneys.

UNITED STATES PATENT OFFICE.

VALERIUS D. ANDERSON, OF CLEVELAND, OHIO.

STEAM-TRAP.

SPECIFICATION forming part of Letters Patent No. 525,524, dated September 4, 1894.

Application filed April 26, 1894. Serial No. 509,099. (No model.)

*To all whom it may concern:*

Be it known that I, VALERIUS D. ANDERSON, a citizen of the United States, residing at Cleveland, in the county of Cuyahoga and State of Ohio, have invented certain new and useful Improvements in Steam-Traps, of which the following is a specification.

My invention relates to steam traps, and consists primarily in means whereby the outlet valve may be positively forced away from its seat whenever necessary.

The invention further consists in a novel construction and arrangement of parts, whereby I am enabled to remove the valve seat for cleaning, repair or renewal, without disturbing other parts or interrupting the working of the trap.

The accompanying drawings illustrate the invention as embodied in practical form.

Figure 1:
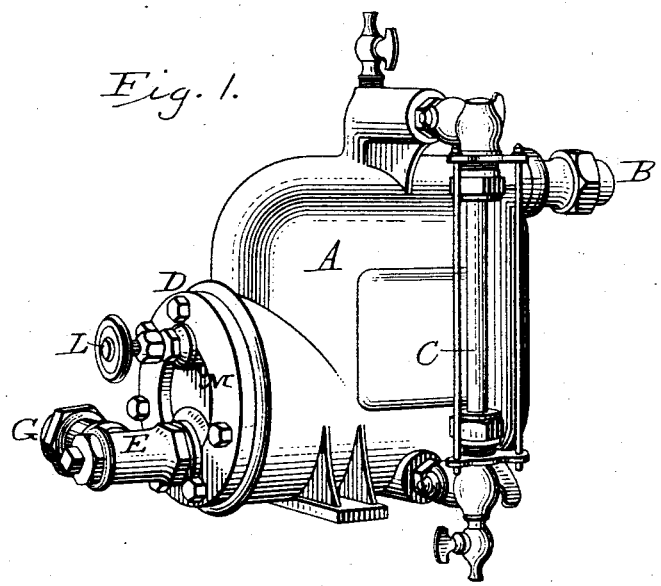
Figure 2:
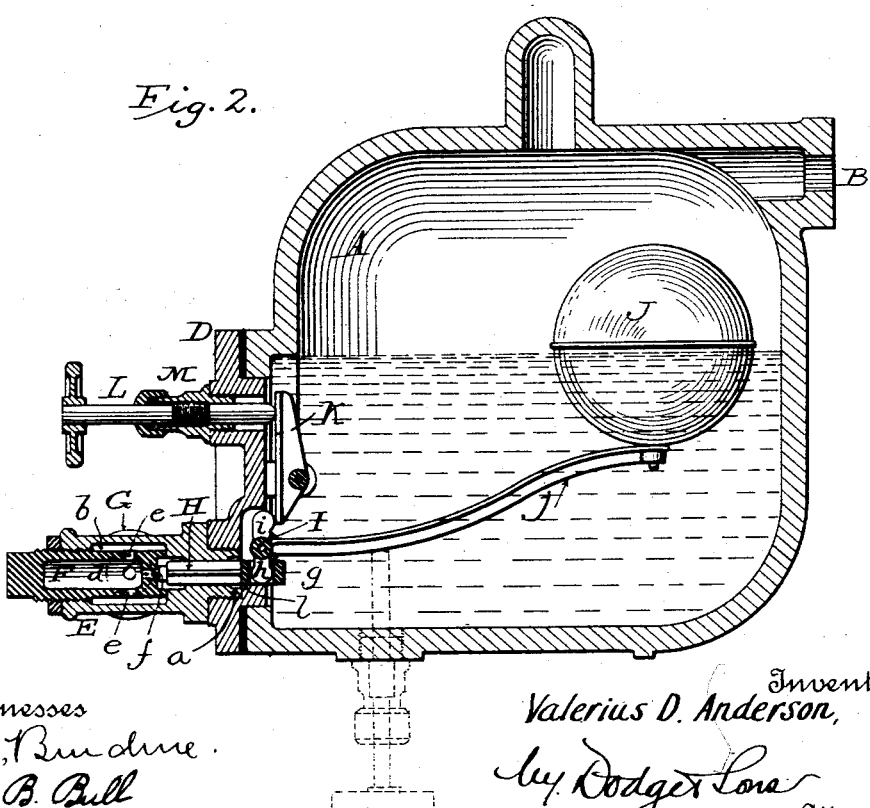

Figure 1 is a perspective view of the trap complete; and Fig. 2, a vertical central section.

In the practical use of steam traps it not infrequently happens that the outlet passage becomes clogged; that a particle of sediment, grit or other matter of one kind or another lodges between the valve seat and valve, and prevents proper closing; or that the valve sticks in its seat.

To provide an escape for the water in the event of clogging of the usual outlet, it is customary to provide a second passage or "by-pass," controlled by a special valve or plug, which is opened only when the usual passage becomes accidentally closed. The provision of such by-pass permits the trap to continue in use and avoids the necessity of at once shutting down the machinery; but it does not afford means of clearing the usual outlet, nor of unseating the valve. It moreover, adds to the complication and cost of the trap and is therefore undesirable.

Instead of providing the usual by-pass or separate outlet, I combine with the escape valve of my trap a device by which the valve may be moved and held away from its seat, to release any small particles of matter or any sediment that may have lodged between them, and permit the steam pressure to act upon and blow out such deposit. Practical use of such a trap for a considerable length of time has demonstrated that in a very large percentage of cases the passage can be quickly cleared in this way. In order to provide also for those few cases in which the deposit cannot be thus blown out, and to permit a ready inspection of the valve seat, its cleaning, redressing, &c., I form said seat in a plug inserted and removable from the exterior of the trap.

Referring again to the drawings, A indicates the shell or body of my improved trap, provided with an inlet B, a water gage or tube C, and a removable end plate or head D, which latter carries the operative mechanism of the trap. The water glass is not essential, but is advantageous in that it shows the condition of the apparatus and indicates whether it is operating properly or not.

E indicates a tubular neck projecting from the head or end-plate D, and having a passage $a$ communicating with the interior of shell A, for escape of water. Outside of or beyond the passage $a$, the neck E has an enlarged interior opening $b$, within which extends a tubular shell F, screwed through the outer end of neck E, as shown in Fig. 2, and locked in place by a jam-nut $c$. The inner end of shell F has a central opening $d$, in axial alignment with passage $a$ of neck E, and through the sides of said shell are formed openings $e$, through which the water may escape into the space $b$, and thence to an outlet or waste pipe G, Fig. 1.

H indicates a longitudinally movable slide, which is grooved or channeled throughout most of its length so that it may have proper bearing and guidance in passage $a$, without closing said passage. The outer end of slide H is made conical, to constitute a valve $f$, which normally seats itself in the mouth of opening $d$ and prevents escape of water from the shell or casing A. The inner end of slide H is made in the form of a yoke or eye $g$, to receive an arm $h$ projecting from a short rocker I, pivoted between or journaled in lugs or ears projecting from the head or end plate D. From the rocker I a similar short arm $i$ projects upward, and a long arm or lever $j$ extends upward and rearward to a suitable point within the shell or casing, where it is furnished with a float J.

From the foregoing description it will be seen that so long as there is no water within shell or casing A, or until it reaches a predetermined level therein and raises float J, said float and the arm $j$ which carries it will act to move slide H outward and to seat valve $f$ against the mouth of opening $d$; but whenever the water rises in the shell sufficiently to raise the float, the valve will be withdrawn and the water allowed to escape until the float falls sufficiently to effect a re-seating of the valve. This is the ordinary action of steam traps of this general type.

K indicates a lever, pivoted or journaled in ears projecting from the head or end plate D, and so arranged that one end bears against the rear face of arm $i$ of the rocker I, while the other end bears against the end of a screw stem L passing through a threaded nipple M, provided with a suitable packing gland, as shown.

By turning the screw stem L, which is furnished with a hand wheel for the purpose, the lever K may be rocked about its pivot, and its lower end caused to act against arm $i$ of rocker I in such manner as to move said arm forward, thereby throwing arm $h$ backward, carrying the slide H inward and forcibly withdrawing valve $f$ from its seat, regardless of the presence, height, or absence of water in shell or casing A. In this way any matter lodged between the valve and its seat may be released from the pressure of the valve, and subjected to the pressure of steam within the shell A, which in almost all cases will blow out such particles, or any deposit that may form in the outlet passages.

When the parts are in normal adjustment, the lower end of lever K forms a stop to limit the movement of arm $i$ of the rocker I, and consequently determines the level to which the float may descend.

Should it happen that the positive retraction of the valve and the consequent application of steam pressure fail to clear the outlet passages, the tubular shell F may be unscrewed and taken out, the valve seat and passage $d$ cleared, the neck E freed of any sediment or deposit, and the shell F replaced without disturbing any other part of the trap.

To prevent the water and steam from escaping while the shell F is thus removed, it is only necessary to back the screw stem L sufficiently to permit the solid cylindrical portion $l$ of slide H to enter the passage $a$, which it will then seal sufficiently for practical purposes during the short time that it is necessary to keep the shell F out of its place.

It will be observed that all the movable or operative parts of the trap are attached to and carried by the removable head or plate D, and that by removing said plate, access may be readily gained to all of said parts without disturbing their relation to one another.

It is obvious that the screw stem L may enter through the bottom of the shell and bear directly against the under side of float lever $j$ as indicated by dotted lines in Fig. 2; or the rocker I may be carried by a rockshaft extending to the outside of the shell.

Having thus described my invention, what I claim is—

1. In combination with a shell or casing of a steam trap provided with an escape passage $a$, and with a tubular shell F having passage $d$, slide H provided with valve $f$ to seal the opening $d$, and with cylindrical portion $l$ to seal passage $a$ when the tubular shell F is removed.

2. The herein-described steam trap, consisting of shell or casing A provided with escape passages $a$ and $d$, slide H provided with valve $f$, rocker I, provided with arms $h$, $i$ and $j$, float J carried by arm $j$, lever K bearing at one end against arm $i$, and rod or stem L bearing against the other end of lever L, all substantially as set forth.

In witness whereof I hereunto set my hand in the presence of two witnesses.

VALERIUS D. ANDERSON.

Witnesses:
 JAS. B. PASKINS,
 WM. H. DE WITT.